United States Patent

Dyer

[15] 3,694,758

[45] Sept. 26, 1972

[54] FREQUENCY RESPONSIVE MULTI-PHASE PULSE GENERATOR

[72] Inventor: George A. Dyer, San Juan Capistrano, Calif.

[73] Assignee: North American Rockwell Corporation, Pittsburgh, Pa.

[22] Filed: April 30, 1971

[21] Appl. No.: 138,971

[52] U.S. Cl. ......................328/63, 328/140, 328/164

[51] Int. Cl. ................................................H03k 1/00

[58] Field of Search.....328/55, 62, 63, 133, 164, 140

[56] References Cited

UNITED STATES PATENTS

| | | | |
|---|---|---|---|
| 3,504,288 | 3/1970 | Ross | 328/63 |
| 3,413,480 | 11/1968 | Breunig et al. | 307/233 |
| 3,249,878 | 5/1966 | Magin | 328/63 |
| 3,401,346 | 9/1968 | Brown et al. | 328/110 |
| 3,204,124 | 8/1965 | Durio | 307/233 |
| 3,488,526 | 1/1970 | Bohrer et al. | 328/164 |
| 3,527,887 | 9/1970 | Clapp et al. | 328/164 |

*Primary Examiner*—James W. Lawrence
*Assistant Examiner*—Harold A. Dixon
*Attorney*—John R. Bronaugh, Floyd S. Levinson, E. Dennis O'Connor, Richard A. Speer and Jackson & Jones

[57] ABSTRACT

A frequency responsive multi-phase pulse generator for providing a plurality of phased output pulses at several output terminals is disclosed. The time of occurrence of the output pulses is controlled with respect to the duration of input clock signal periods and is automatically varied in proportion to changes in the input clock signal frequency. The frequency of the clock signals is detected by a transition detector circuit and an electric tachometer. A delay pulsing circuit provides delay pulses having a pulse width that is a function of the frequency of the clock signal. These delay pulses, along with the input clock signals are applied to control the operation of a bistable circuit which operates to provide delayed output pulses at a pair of output terminals thereof. Output pulses are also provided by the transition detector circuit. The temporal relationships of these output pulses, with respect to each other, will be proportionally varied in accordance with changes in the clock signal frequency.

15 Claims, 5 Drawing Figures

FREQUENCY RESPONSIVE MULTI-PHASE PULSE GENERATOR

BACKGROUND OF THE INVENTION

1. Field of the Invention

The present invention generally relates to pulsing circuits for providing pulsed output signals. More particularly, the present invention concerns a pulse generator for providing output pulses at several output terminals wherein the temporal relationships of the respective output pulses, with respect to a selected time period, are proportionally varied in accordance with variations in the selected time period.

2. Description of the Prior Art

There are a number of industrial machines that involve a redundant cyclic operation of a multiplicity of elements which are controlled in accordance with a rate of movement, such as revolutions per minute. This movement may determine the whereabouts of the moving elements at selected times. Stationary control devices may therefore have to be energized in accordance with the rate of movement. Difficulties arise when the rate of movement is subject to changes. Typically, some means of adjustment is provided to enable corrections for undesired changes or other adjustments.

Ordinarily, adjustments are done manually and require stopping the operation of the machine. In extreme cases, adjustments may even require dismantling a portion of the machine. In those cases where the operation of the machine is not interrupted, either a tolerable range of variations in the rate of movement is designed into the machine or the adjustment is trivial and may be made while the machine is operating. The latter case is exemplified by many well known teletypewriter devices which require and allow motor adjustments to ensure that the speed of operation of all teletypewriters in a communications network is substantially identical. Such adjustments to a teletypewriter usually involve simply moving a mechanical device on the armature of the motor.

To attempt to ensure that no changes will occur in the rate of movement of a machine part is obviously as unrealistic and impractical as having to make adjustments when large complex machines are considered. A rotating knitting machine, which may involve control or timing pulses that are derived from clock signals synchronized with the speed of rotation of the knitting mechanism is an example of such complex machines. Changes in the speed of rotation are both expected and in some cases desirable. Accordingly, some means must be provided for altering the temporal incidence of the control signals whenever the rotational rate and, hence the clock signal frequency, is varied such that control signals will coincide with the presence of elements to be controlled.

It is thus the intention of the present invention to provide a pulse generator that will develop output pulses that may be used as control or timing pulses and which pulses will occur in accordance with a preselected temporal relationship that is varied in proportion and in response to changes in the frequency of a clock signal.

SUMMARY OF THE INVENTION

Briefly described, the present invention concerns a circuit that is intended to provide pulsed output signals at a plurality of output terminals wherein the times of occurrence of such output signals are dependent on the frequency or pulse repetition rate of a clock signal applied as an input to the circuit.

More particularly, the subject frequency responsive multi-phase pulse generator includes frequency detecting circuitry for detecting the frequency or pulse repetition rate of input clock signals, a circuit for providing delay pulses having a width that is varied in accordance with the detected frequency of the clock signal, and a bistable device which is responsive to the clock signals and the delay pulses to generate output signals at a pair of output terminals thereof. Other output signals are provided at the frequency detection circuitry. The time intervals at which the several output signals occur will be dependent on the frequency and hence the clock period of the clock signals and will be varied in proportion and in accordance with changes in frequency.

The features that characterize the novelty of the present invention are set forth with particularity in the appended claims. Both the organization and manner of operation of the invention, as well as the objects and attendant advantages thereof, may be best understood by reference to the following detailed description taken in conjunction with the accompanying drawings wherein like reference symbols designate like parts throughout the figures thereof.

DESCRIPTION OF THE PREFERRED EMBODIMENT

Figure 1:
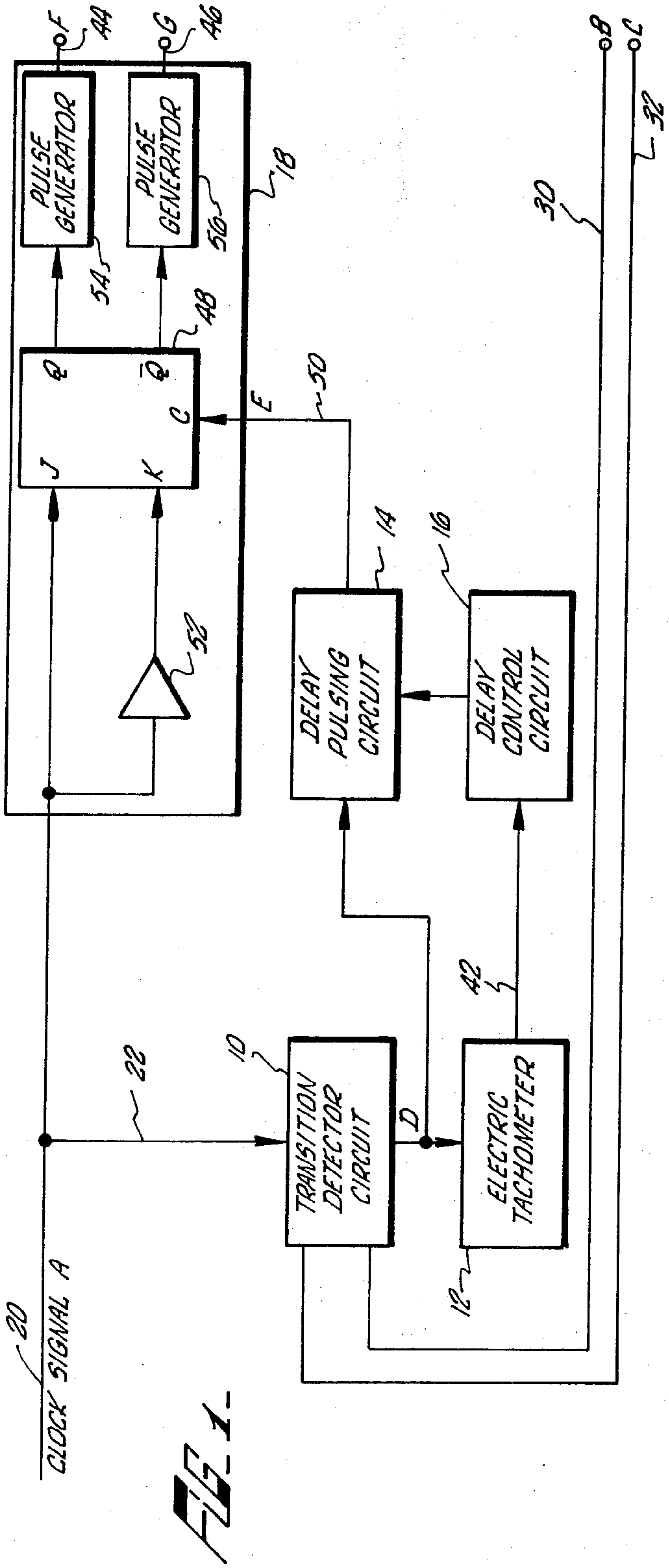
FIG. 1 is a schematic block diagram illustrating a preferred embodiment of the present invention.

Referring to FIG. 1 of the drawings a frequency responsive multi-phase pulse generator in accordance with the present invention includes a transition detector circuit 10, an electric tachometer 12, a delay pulsing circuit 14, a pulse width control circuit 16, and a bistable circuit 18.

Clock signals which may be uniformly periodic, are applied as an input signal to the bistable circuit 18 over a lead 20. The transition detector circuit 10 also receives such clock signals over a lead 22. These clock signals may be any periodic signal having a uniform format, i.e., a pulsed signal wherein the pulse width is equal to the interpulse period. Typical pulsed clock signals are illustrated by waveforms A, A', and A'' of FIGS. 4 and 5.

Figure 2:
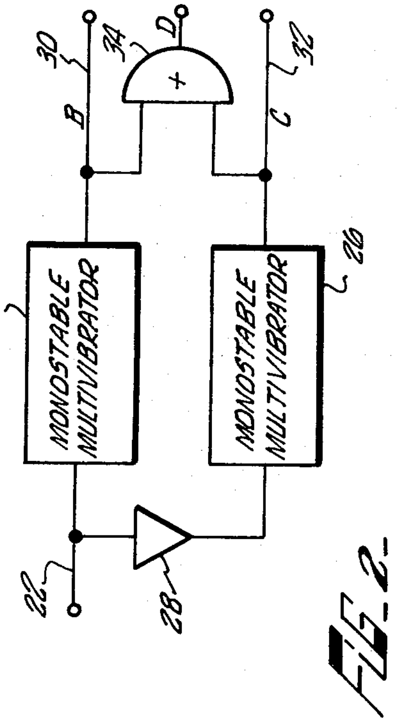
FIG. 2 is a schematic block diagram illustrating a transition detector circuit that is suitable for use in conjunction with the present invention.

The transition detector circuit 10 operates to detect each transition of the clock signal from one level to another whether the transition is upgoing or downgoing. As shown by FIG. 2, the transition detector circuit 10 may include a pair of monostable multivibrators 24 and 26 to which clock signals are applied via the lead 22. The clock signals are inverted by an inverter 28 before application to the multivibrator 26. Accordingly, the multivibrator 24 will produce an output at the beginning and/or end of each clock pulse period while the multivibrator 26 will provide an output at the middle of each clock pulse period for the midperiod transitions. Waveforms B and C respectively illustrate the output pulses produced by the transition detector circuit 10 in response to clock signals as shown by waveform A.

The respective outputs of the multivibrators 24 and 26, (waveforms B and C, respectively) are tapped and become two of four output signals provided by the generator. These multivibrator signals are provided as outputs at a pair of terminals 30 and 32, respectively, and are also applied as the inputs to an OR gate 34. Waveform D illustrates the signal that will result as an output from the OR gate 34. As shown, this output signal of the OR gate 34 will be a train of pulses occurring at regular intervals and corresponding to each of the transitions of the clock signal (waveform A).

Figure 3:
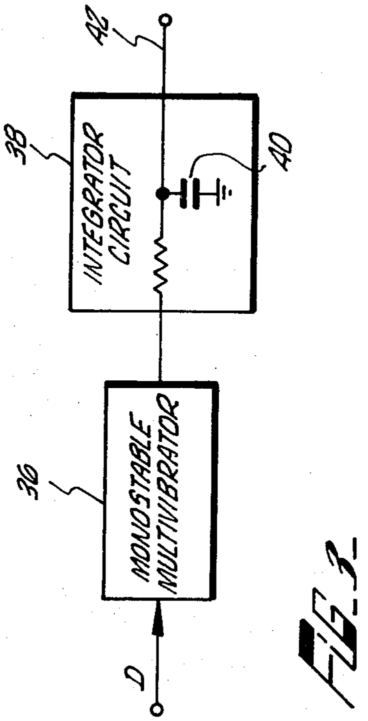
FIG. 3 is a schematic block diagram illustrating an electric tachometer that is suitable for use in conjunction with the present invention.

The electric tachometer 12 receives the train of pulses (waveform D) provided by the transition detector circuit 10 and, in response thereto, provides a signal having a voltage level that is a direct function of the frequency, or pulse repetition rate, of the clock signal, i.e., increases in frequency will raise the voltage level of the tachometer output signal. Any electric tachometer, well known in the prior art, may be employed for this purpose. However, an exemplary electric tachometer is shown by FIG. 3 and may include a monostable multivibrator 36 connected in series with an integrator circuit 38. Pulses from the multivibrator 36 charge a capacitor 40 that may be included in the integrator 38. The voltage level to which the capacitor 38 is charged will vary in accordance with the rate at which such pulses are applied to the integrator 38. Since the frequency of pulses from the transition detector circuit 10, which are applied to the multivibrator 36, vary in direct proportion to the clock signal frequency, increases in the clock signal frequency will result in higher voltage levels for the output of the tachometer 12.

The delay pulsing circuit 14 also is coupled to receive as an input signal thereto the pulses of waveform D from the transition detector circuit 10. The pulsing circuit 14 also receives a control signal from the control circuit 16. This pulsing circuit 14, which serves to provide pulses having a width that will vary in direct proportion to the clock signal frequency, may also be a monostable multivibrator that is connected to receive the output pulses (waveform D) from the detector circuit 10. Pulse width is controlled by varying the RC time constant of the multivibrator, i.e., resistance may be added or removed. To this end, the pulse width control circuit 16 may simply be a voltage dependent variable resistor whose resistance varies inversely to the voltage applied thereto and which is connected to respond to output voltages applied from the tachometer 12 via the lead 42. A scaling amplifier also may be included to properly scale the tachometer output voltages.

The delay pulsing circuit 14 will hence provide delay pulses having pulse widths that are controlled by the pulse width control circuit 16 in response to the tachometer output signals, narrower pulse widths being provided for increased clock signal frequencies. Conversely, a reduction in the clock signal frequency will result in wider pulse widths. An exemplary train of delay pulses that may be provided by the pulsing circuit 14 is illustrated by waveform E of FIG. 4.

The bistable circuit 18 serves to provide the remaining two of four output signals of the subject generator at a pair of output terminals 44 and 46. These two generator output signals are respectively illustrated by the waveforms F and G. The bistable circuit 18 may include a flip-flop 48, or the like, that is connected to be clocked by the trailing edge of each delay pulse provided thereto over a lead 50 from the pulsing circuit 14. The use of an inverter (not shown), for example, would be expedient for this purpose. The input clock signals (waveform A) are applied to the conventional SET and RESET terminals of the flip-flop 48. An inverter 52 is employed to couple the clock signals to the RESET, or K, terminal such that the SET and RESET terminals are respectively enabled during the positive and negative half cycles of the clock signal. As may be observed by reference to the waveforms A and E, the flip-flop 48 can then be made to change state, and hence produce an output at the two conventional outputs thereof, twice during each clock pulse period. The flip-flop 48 would be SET during the positive half cycles of the clock signal and thereby enable an output at the Q output terminal when the flip-flop 48 is clocked. Similarly, the flip-flop 48 would be RESET during the negative half cycles of the clock signal and thereby enable an output at the $\overline{Q}$ output when the flip-flop 48 is clocked.

The Q and $\overline{Q}$ outputs of the flip-flop 48 may be applied to a pair of monostable multivibrators 54 and 56, respectively, such that desired pulse signals are provided at the pair of output terminals 44 and 46. The monostable multivibrators 54 and 56 may be identical to the multivibrators 24 and 26, included in the pulse transition circuit 10, such that the pulses provided at the output terminals 30, 32, 44 and 46 are of compatible amplitude and pulse durations.

As may be observed, the pulses appearing at the terminals 30 and 44 (waveforms B and F, respectively) both occur during the positive half cycle of the clock signal (waveform A). The pulses provided at the terminals 32 and 46 (waveforms C and G, respectively), on the other hand, occur during the negative half cycle of the clock signal. The relationships of the pairs of pulse trains are identical since the relative delay of the pulses at the output terminal 44, with respect to the pulses provided at the output terminal 30, is equal to the relative time delay between the pulses provided at the terminals 32 and 46. The waveforms B + F and C + G illustrate the identical relationships.

Considering the waveforms B + F for purposes of explanation, since the pulses of waveform F are delayed relative to the pulses of waveform B by an amount controlled by the width of the delay pulses provided by the delay pulsing circuit 14, the interpulse spacing will continually reflect any change in the clock signal frequency. For example, if the frequency is reduced, clock pulse periods will be increased, the width of delay pulses from the pulsing circuit 14 will be increased, and the relative spacing between the pulses of the waveforms B and F will be increased.

Figure 4:
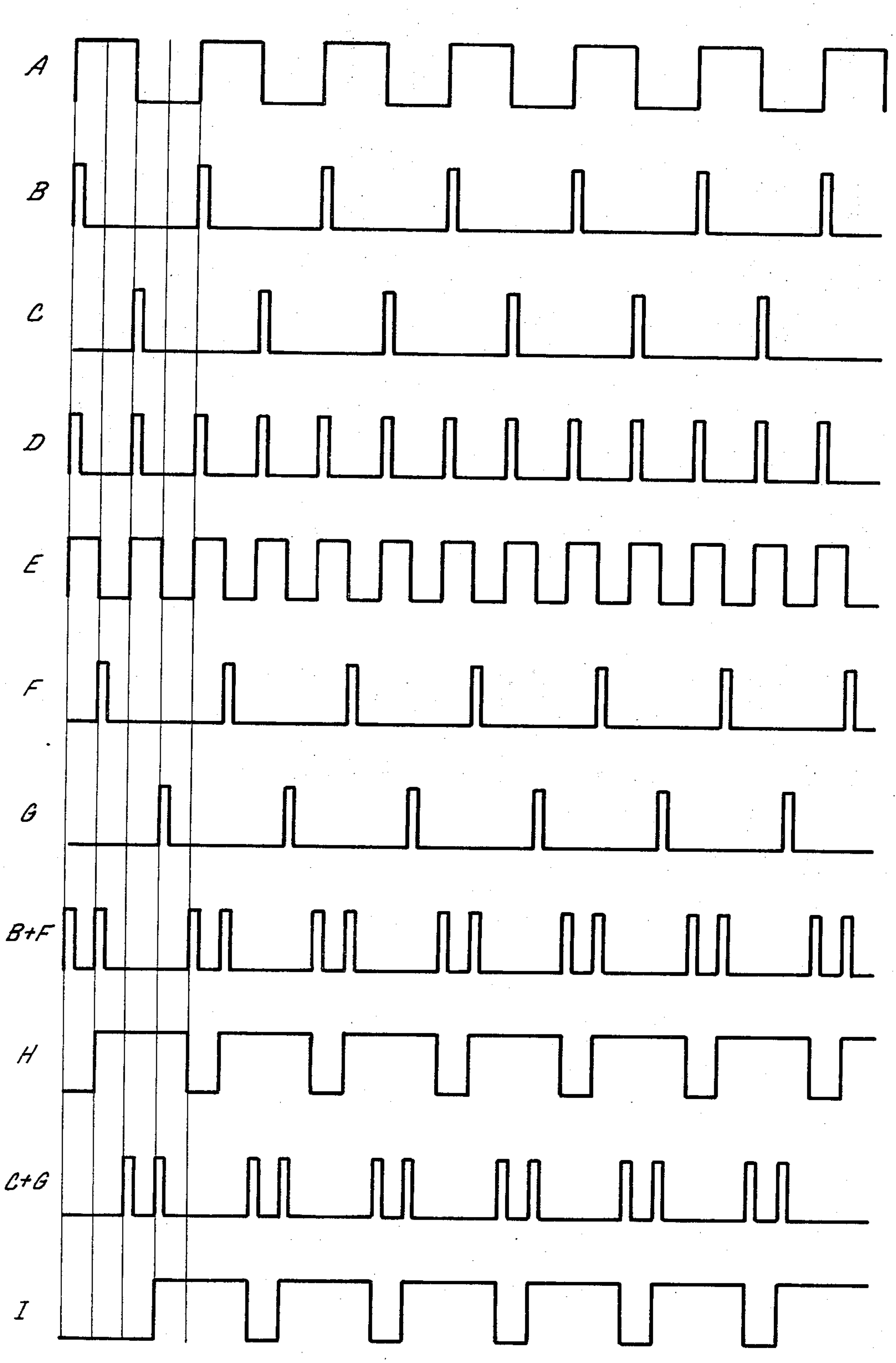
FIGS. 4 and 5 are graphic diagrams including several waveforms which are useful in obtaining an understanding of the operation of the present invention.
Figure 5:
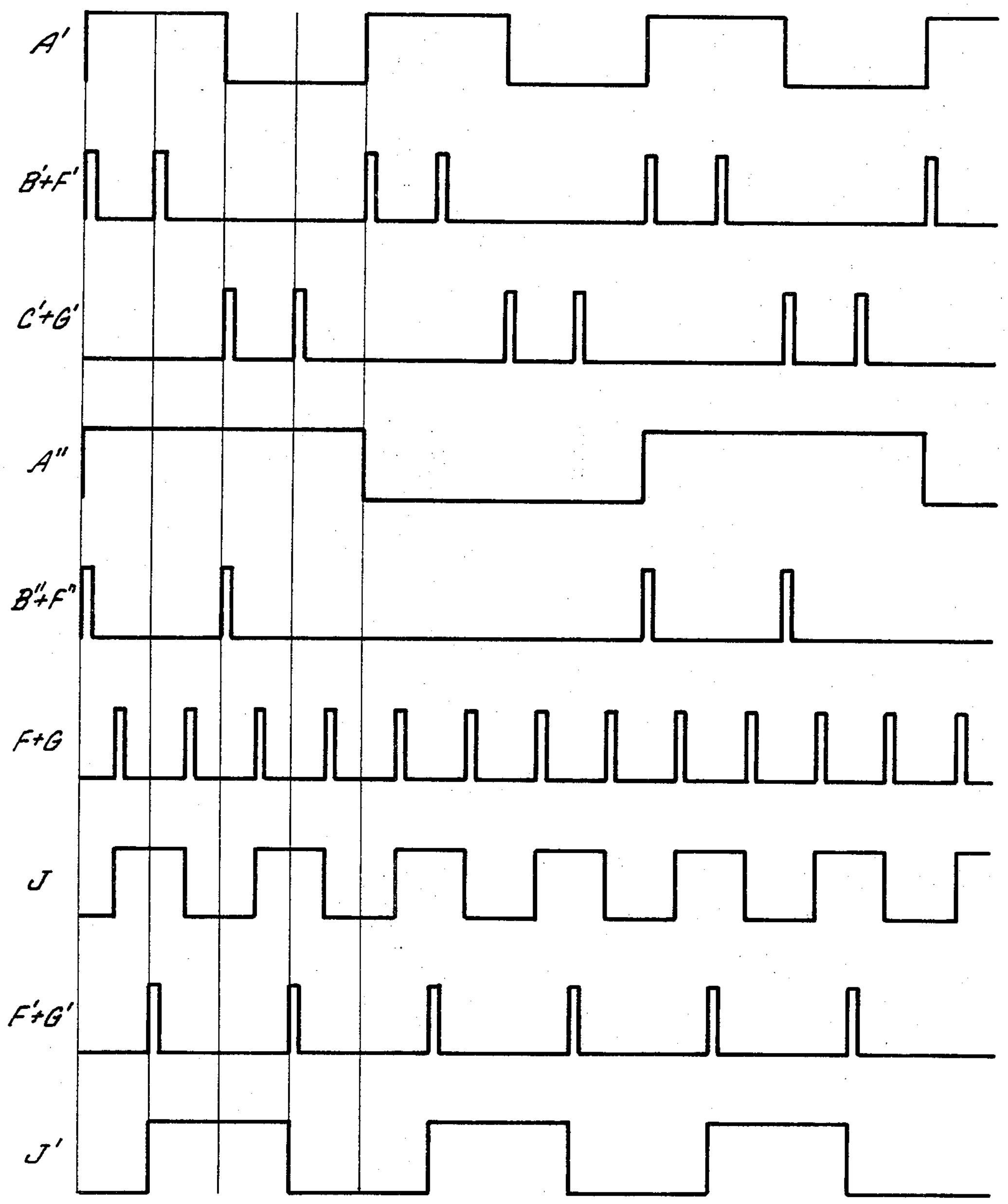

By preselecting a pulse width for the output delay pulses of a pulsing circuit 14, and a compatible change rate for the voltage dependent resistance of the pulse width control circuit 16, initial spacing for the pulses of the waveforms F with respect to the pulses of the waveforms B can be selected, i.e., one-fifth of a clock signal period. As shown in FIG. 4, if the period between pulses of the waveform B is a time period X and the delay between the times of occurrence of waveform F pulses, relative to waveform B pulses, is a period Y, the subject generator will operate to maintain the ratio Y/X constant, regardless of changes in the clock signal frequency. This is illustrated by the set of waveforms A', B' + F', and C' + G', and the set of waveforms A'', and B'' + F'', which show the effect of a clock pulse period that has conveniently been doubled (waveform A') and redoubled (waveform A'') to twice reduce, by a half, the clock signal frequency.

The benefits and requirements of being able to maintain a proportional temporal relationship between a number of recurring pulses is readily apparent when the present invention is considered in light of the requirements of a rotary knitting machine in which electrical pulses are used to control the operation of knitting needles aligned about the periphery of a rotating drum. Obviously, control pulses which are applied to non-rotating control devices stationed near the periphery of the drum, and which are cyclically traversed by needles to be controlled on the rotating drum, must be in time synchronism with the movement of the needles. Since such movement is directly dependent on the rotation of the drum, control pulses that are timed in accordance with such rotation may be readily brought into the desired time synchronism.

In the present invention, if the clock signals applied thereto are representative of the rotation of the knitting drum, then the pulses at the output terminals 30, 32, 44 and 46 will continually be timed in accordance with the rotation rate of the drum. Pairs of output pulses from the generator may then be employed for a number of control purposes. For example, if the pulses provided at the output terminal 44 (waveform F) are adapted to switch a mechanism ON, then the pulses provided at the output terminal 30 (waveform B) can be used to turn the mechanism OFF after a selected interval. Such a cyclic operation is illustrated by waveform H. Naturally, the converse also holds true. As earlier mentioned, the output pulses at the terminals 32 and 46 simply correspond to the negative half cycle of clock signals while the pulses at the terminals 30 and 44 correspond to the positive half cycles of the clock signal. Thus, waveform I illustrates an ON/OFF duty cycle that corresponds to generator output pulses provided at the output terminals 32 and 46 and occurring during negative half cycles of the clock signal.

When all four of the output pulses of the generator (waveforms B, C, F and G) are used in combination, a four-phase control is provided wherein an output pulse will be available at four successive times in each clock signal period. The output pulses will maintain a proportional temporal spacing for increased or decreased clock frequencies. Otherwise stated, the four output pulses will maintain their relative positions within a clock signal period such that for shorter clock signal periods the output pulses will become more closely spaced and vice versa.

A further use for the output pulses would be to develop a delayed clock signal which is delayed by a time period that will be changed in accordance with changes in clock signal frequency. If the output pulses at the terminals 44 and 46 are used in combination, for example, by being combined as shown by the waveform F + G, the resulting pulse train will be a delayed version of the pulse train waveform D (corresponding to transients of the clock signal). Accordingly, if the output pulses available at the output terminls 44 (waveform F) are used to switch a signal ON, or HIGH, and the output pulses available at the output terminal 46 (waveform G) are used to switch a signal OFF, or LOW, a delayed clock signal as illustrated by the waveform J will be produced.

The waveforms F' + G', and J' illustrate how delayed clock pulses corresponding to the lower frequency clock signal of waveform A' would be delayed by a proportionally longer time period.

It is now clear that the present invention provides a frequency dependent pulse generator that will provide, at multiple output terminals, pulses having a temporal relationship that will be altered in proportion to any increases or decreases in the frequency, or clock pulse rate, of a uniformly repetitious input signal.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A generator adapted to provide multiple output pulses at multiple terminals and at selected time intervals within a predetermined time period corresponding to cycles of an input signal, the time intervals being varied in direct proportion to changes in the predetermined period, said generator comprising, detector means connected to receive the input signal and including means to generate an output pulse for each transition of the input signal from one level to another, control circuit means receiving the output pulse from said detector means and delivering a pulsed signal in which the width of the pulses comprising the signal vary as a direct inverse function of the input signal frequency, and bistable means receiving the input signal and the pulses from said control circuit means, said bistable means acting to release an input pulse only on a time controlled basis as determined by said control circuit means.

2. An apparatus as defined in claim 1 wherein said control circuit means comprises means receiving the output pulse from said detector means and provides a signal having a voltage level that is a direct function of the input signal frequency, and means responsive to the signal from the means receiving the output pulse from said detector means to produce pulses having widths that vary as a direct function of the voltage level produced by said output pulse receiving means.

3. An apparatus as defined in claim 2 wherein said control circuit means includes a monostable multivibrator having the transition output pulses applied as inputs thereto, and wherein said means for varying the width of the pulsed signal is a voltage dependent variable resistance element.

4. The apparatus defined by claim 2 wherein said pulsing means is a monostable multivibrator having said transition output pulses applied as inputs thereto, and said control means is a voltage dependent variable resistance element for varying the width of pulses provided by said monostable multivibrator.

5. The apparatus defined by claim 1 wherein said detector means includes first and second pulsing circuits respectively adapted to provide transition output pulses in response to alternate transitions of said input signal.

6. The apparatus defined by claim 5 wherein said first and second pulsing circuits include monostable multivibrators, one of which is adapted to receive inverted input signals.

7. The apparatus defined by claim 1 wherein said bistable means includes:

a bistable device adapted to change states in response to said control circuit pulses, a pair of state signals being provided; and first and second pulsing means responsive to the application of said state signals.

8. The apparatus defined by claim 7 wherein said bistable device is a flip-flop having said input signal applied to the SET and RESET terminals thereof to have said flip-flop enabled to change states at each transition of said input signal.

9. A frequency responsive pulse generator of the type adapted to provide a plurality of output pulses at successive time intervals dependent on the frequency of an input clock signal having equal positive and negative half cycles, the generator comprising:

detector means for detecting the transitions of said clock signal, first and second transition output pulses being provided in response thereto;

control circuit means responsive to said transition output pulses, for providing a pulse during each half cycle of said clock signal, each said pulse having a pulse width varying inversely with the frequency of said clock signals; and bistable means responsive to said clock signals and said delay pulses for providing first and second output pulses which respectively succeed said first and second transition output pulses by time intervals determined by the pulse width of said signal.

10. The apparatus defined by claim 9 wherein said bistable means includes:

a bistable device adapted to receive said clock signal at the input terminals thereof, said clock signals enabling said device to change states in response to any said pulses applied thereto said bistable device providing state signals corresponding to the state of said bistable device;

means responsive to said state signals for providing said output pulses.

11. The apparatus defined by claim 10 wherein said bistable device is a flip-flop circuit having said clock applied to input terminals thereof, said state signals being provided at output terminals thereof.

12. The apparatus defined by claim 9 wherein said detector means includes pulsing devices adapted to provide said transition output pulses in response to said clock signals.

13. The apparatus defined by claim 9 wherein said control circuit means includes:

a pulsing circuit for providing pulses having a predetermined pulse width in response to said transition output pulses;

means for detecting the frequency of said clock signals, a voltage signal having a voltage level representative of said frequency being provided thereof; and pulse width control means for altering the width of said pulses in inverse proportion to changes in said frequency and in response to said voltage signal.

14. The apparatus defined by claim 13 wherein said bistable means includes:

a bistable device adapted to receive said clock signal at the input terminals thereof, said clock signals enabling said device to change states in response to any said delay pulses applied thereto said bistable device providing state signals corresponding to the state of said bistable device;

means responsive to said state signals for providing said delayed output pulses.

15. The apparatus defined by claim 14 wherein said detector means includes pulsing devices adapted to provide said transition output pulses in response to said clock signal.

* * * * *